United States Patent [19] [11] Patent Number: 4,713,522
Kimura [45] Date of Patent: Dec. 15, 1987

| [54] | ELECTRIC HEATING APPLIANCE DETACHABLY MOUNTED IN A MOTOR VEHICLE |
|---|---|
| [75] | Inventor: Shinichi Kimura, Yamatokoriyama, Japan |
| [73] | Assignee: Sharp Kabushiki Kaisha, Osaka, Japan |
| [21] | Appl. No.: 917,803 |
| [22] | Filed: Oct. 10, 1986 |

Related U.S. Application Data

[63] Continuation of Ser. No. 706,834, Feb. 28, 1985, abandoned.

[30] Foreign Application Priority Data

Feb. 28, 1984 [JP] Japan ............................. 59-28789[U]
Feb. 28, 1984 [JP] Japan ............................. 59-28790[U]
Feb. 28, 1984 [JP] Japan ............................. 59-28791[U]

[51] Int. Cl.$^4$ .......................... H05B 1/02; H05B 3/00; A47J 27/00; F24H 1/22
[52] U.S. Cl. .................................. 219/202; 219/385; 219/386; 219/432; 219/441; 219/519
[58] Field of Search ........ 219/200, 201, 202, 385–387, 219/415–419, 432, 433, 436–442, 519

[56] References Cited

U.S. PATENT DOCUMENTS

| 2,450,336 | 9/1948 | Hall ..................................... 219/432 |
| 2,827,540 | 3/1958 | Underwood ..................... 219/202 X |
| 2,861,171 | 11/1958 | Adler ............................... 219/432 X |
| 3,366,776 | 1/1968 | Knight et al. ..................... 219/432 |
| 3,429,252 | 2/1969 | Colonna ......................... 219/432 X |
| 3,539,773 | 11/1970 | Wilson ........................... 219/202 X |
| 3,890,484 | 6/1975 | Kamins et al. ....................... 219/432 |
| 3,915,079 | 10/1975 | Balderson ....................... 219/202 X |
| 4,317,025 | 2/1982 | Starnes ............................... 219/202 |

FOREIGN PATENT DOCUMENTS

| 207452 | 4/1957 | Australia ............................. 219/202 |
| 2055530 | 3/1981 | United Kingdom ................ 219/202 |

Primary Examiner—Anthony Bartis
Attorney, Agent, or Firm—Birch, Stewart, Kolasch & Birch

[57] ABSTRACT

An electric heating unit for detachable mounting in a motor vehicle includes an outer casing adapted to be fixedly secured in the vehicle and having a recessed portion for removably receiving an electrical heating appliance, such as a water heating pot, provided therein with an electric heating element and a temperature sensor capable of producing switching signals indicative of the temperature of the appliance. A power control switch and switch actuator responsive to the temperature sensor are located in the outer casing at a location remote and shielded from the heating element when the appliance is seated in the recessed portion. The power switch is connected in series with the heating element in a power supply circuit by mating detachable connectors on the outer casing and heating appliance. The temperature sensor and switch actuator are connected in series through the detachable mating connectors in a control circuit in parallel with the power supply circuit. The outer casing only partially encloses the appliance thereby permitting use thereof while seated in the casing.

2 Claims, 7 Drawing Figures

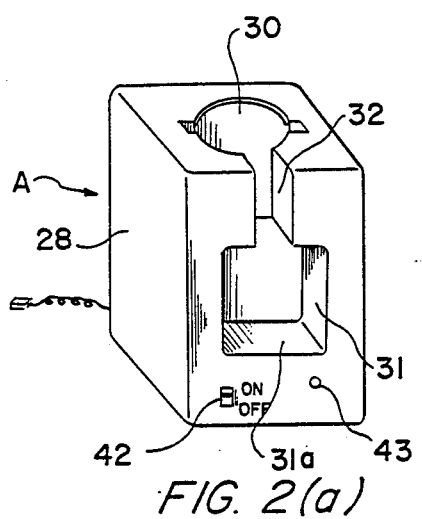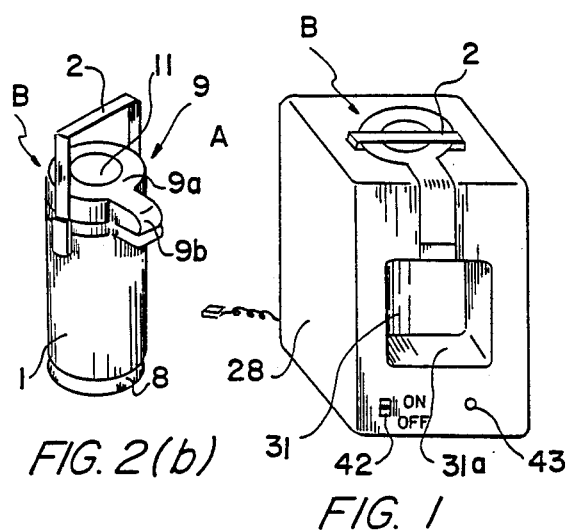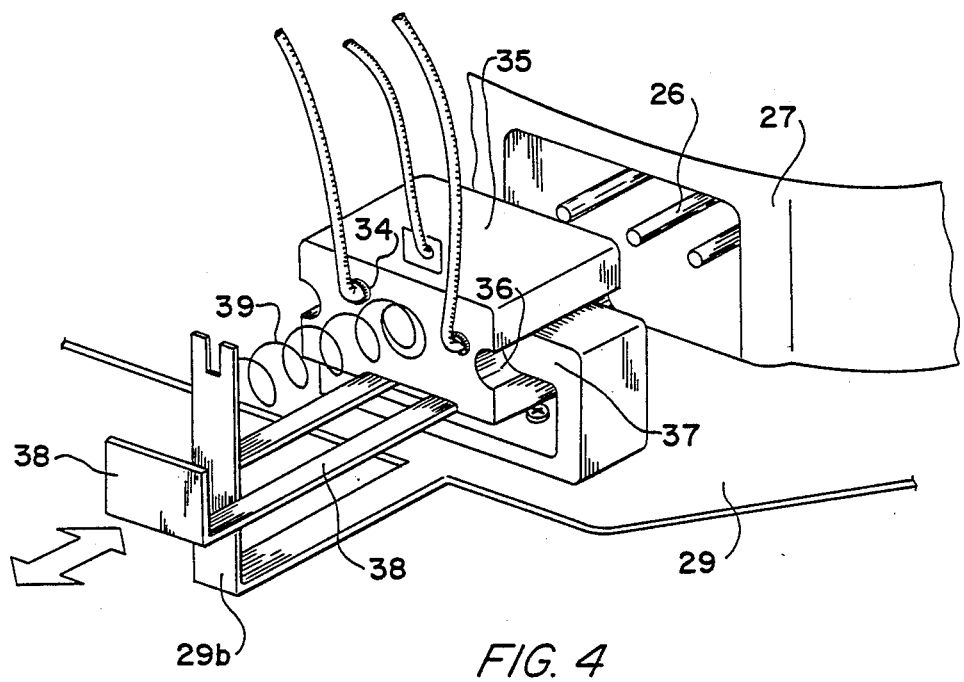

ELECTRIC HEATING APPLIANCE DETACHABLY MOUNTED IN A MOTOR VEHICLE

This application is a continuation of application Ser. No. 706,834, filed on Feb. 28, 1985 and now abandoned.

BACKGROUND OF THE INVENTION

The present invention relates to a heating appliance for installation in a vehicle.

In view of vibration an possible collision of vehicles, it is not preferable to mount a conventional household heating appliance, such as a water heater in a vehicle with power being fed from the battery.

OBJECT AND SUMMARY OF THE INVENTION

An object of the present invention is to provide a heating appliance for installation in a vehicle, in which a heating pot is safely fixed on the vehicle body in a such a manner that it is detachable from the vehicle body when desired.

A further object of the invention is to provide a small heating appliance for installation in a vehicle, in which a heating pot is safely fixed on the vehicle body in such a manner that it is detachable from the vehicle body when desired.

Another object of the invention is to provide a heating appliance for installation in a vehicle, in which a heating pot is safely fixed on the vehicle body in such a manner that it is detachable from the vehicle body when desired with an outer casing thereof being equipped with a switch for easy control of power supply to the heater.

The subject matter of the present invention provides a heating device with an outer casing which does not cover the entire surface of a housed heating appliance so that the heating appliance can be used even when the appliance is stored in the outer casing and the temperature of the heating appliance is detected by a temperature sensor provided within the heating appliance. The supply of electric power to the heating appliance is controlled by a relay provided within the outer casing and responsive to a control signal from the temperature sensor in the heating appliance. The electrical components provided within the outer casing are located in a position remote and shielded from the electric heater of the electric heating appliance when the appliance is stored in the outer casing.

BRIEF DESCRIPTION OF THE DRAWINGS

FIG. 1 is a perspective view of an outer casing fixed on the vehicle body and a heating pot detachably mounted in the outer casing.

FIG. 2A is a perspective view of the outer casing.

FIG. 2B is a perspective view of the heating pot dismounted from the outer casing of FIG. 2A.

FIG. 4 is a perspective view of the connector on the casing side and that on the heating pot side.

DETAILED DESCRIPTION OF THE INVENTION

An example of the present invention in which the heating appliance comprises a heating pot B forming an electric water-heater is explained with reference to FIGS. 1–6.

Figure 3:
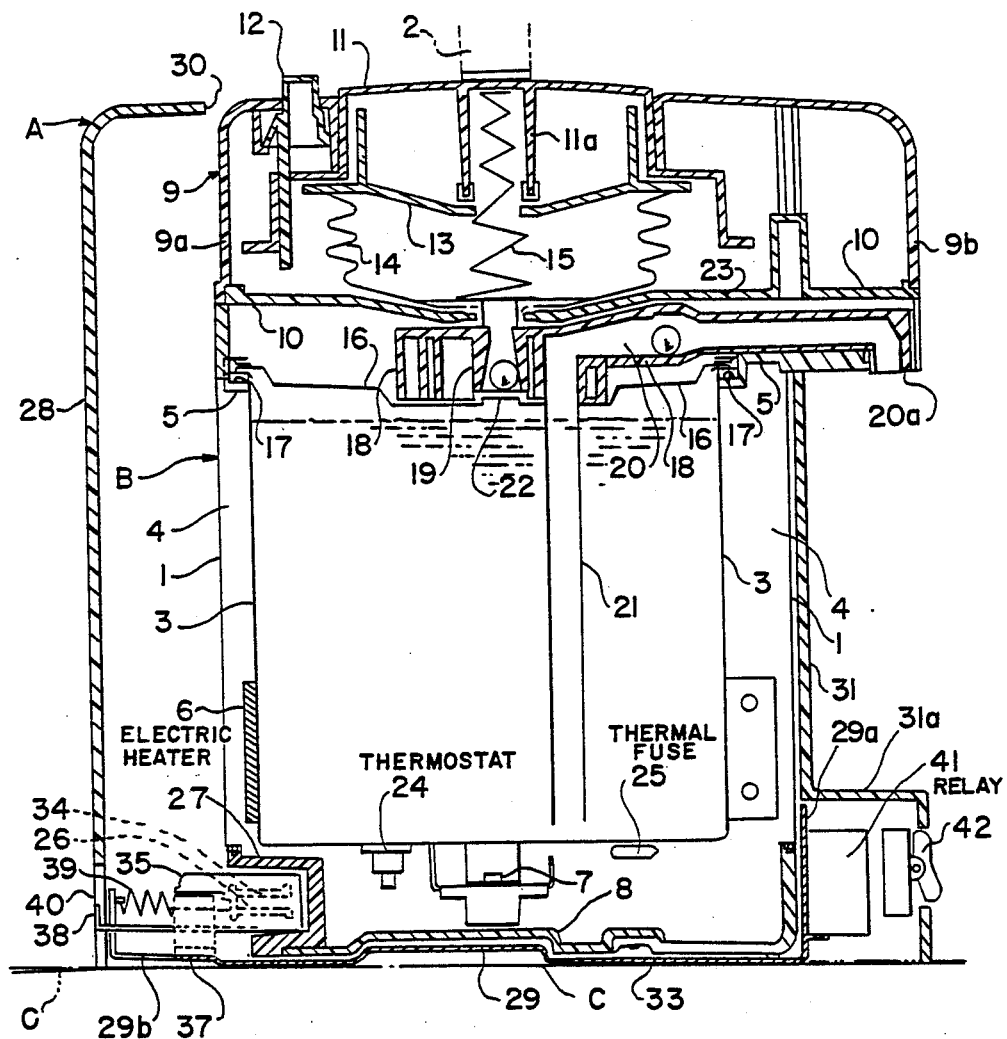
FIG. 3 is a vertical sectional view of the outer casing with the heating pot mounted therein.

Referring to the drawings, particularly FIG. 3, the cylindrical main body 1 of the heating pot B is provided with an extendable handle 2, a metal internal vessel 3 being inserted and fixed in the main body 1, the upper end of the open space 4 between the internal vessel 3 and the main body 1 being sealed by an upper ring 5. An electric heater 6 is secured on the outer side wall of the internal vessel 3 which is fixed at the bottom through a leg 7 on the bottom cover 8. The lower end of the main body 1 is fixed on the upper end of the bottom cover 8. On the upper ring 5 is fixed an outer lid 9 having a cylindrical portion 9a and a projecting portion 9B, the open lower end of the outer lid 9 being closed by a lid cover 10. The outer lid 9 is provided with a push button 11 in its center and a lock lever 12 to lock or release the push button 11. A bellows flange 13 is positioned under a central projection 11a of the button 11, the bottom surface of the flange 13 being connected with the upper end of an air-feeding bellows 14. A spring 15 is provided for returning the button 11 to its original position. The upper end of the internal vessel 3 is sealed or opened by the swing movement of an inner lid 16 provided with a packing 17. An inner plug 18 is provided between the inner lid 16 and the lid cover 10, the inner plug 18 having an air passage 19 in the center and a hot-water passage 20 on one side, the inlet of the hot-water passage 20 being connected with a pumping pipe 21. The air passage 19 and hot-water passage 20 have safety ball valves 22 and 23, respectively. A temperature controlling thermostat 24 serving as a temperature sensor and a thermal fuse 25 are secured on the outer bottom surface of the internal vessel 3. Numeral 26 indicates a heating pot-side connector whose plug is fixed through an insulator 27 between the bottom cover 8 and the main body 1.

Referring to FIGS. 1, 2A and 2B, the outer casing A consists of a square pillar case main body 28 surrounding substantially the entire cylindrical surface of the heating pot B and a metal square dish-shaped fixing plate 29 (FIG. 4) whose flange 29a is secured on the lower part of the case main body 28. The case main body 28 is made of synthetic resin and has a round openng 30 in the top side, a recess 31 in the front side and a cut-away portion 32 communicating said opening 30 and said recess 31. The fixing plate 29 is fixed to the vehicle body C.

A casing-side connector 34 is provided on the fixing plate 29 side so that it is detachably fitted to the heating pot-side connector 26. As shown in FIG. 4. the casing-side connector 34 is enclosed by an insulating body 35 that has a groove 36 on each lateral side. A support 37 which is slidably engaged with the groove 36 is secured on the fixing plate 29. An operating plate 38 protrudes from the bottom of the insulating body 35. A compression spring 39 is interposed between the insulating body 35 and an extension flange 29b of the fixing plate 29.

When the operating plate 38 is pulled out, against the force of the spring 39, by hand through a slit 40 formed in the lower part of the outer casing A, the casing-side connector 34 is disconnected from the heating pot-side connector 26 so that it is possible to take out the heating pot B from the casing A upwardly. In mounting the heating pot B in the casing A, the operating plate 38 is depressed after placing the heating pot B on the fixing plate 29, whereby the heating pot-side connector 26 is inserted into the casing-side connector 34, locking the heating pot B in the casing A. An electric circuit-controlling relay 41 housed in the casing is fixed on a flange 29a of the fixing plate 29 so that it is shielded and protected from heat of the electric heater 6 positioned on the opposite side from the relay when the heating pot B is positioned in recess 31.

Figure 5:
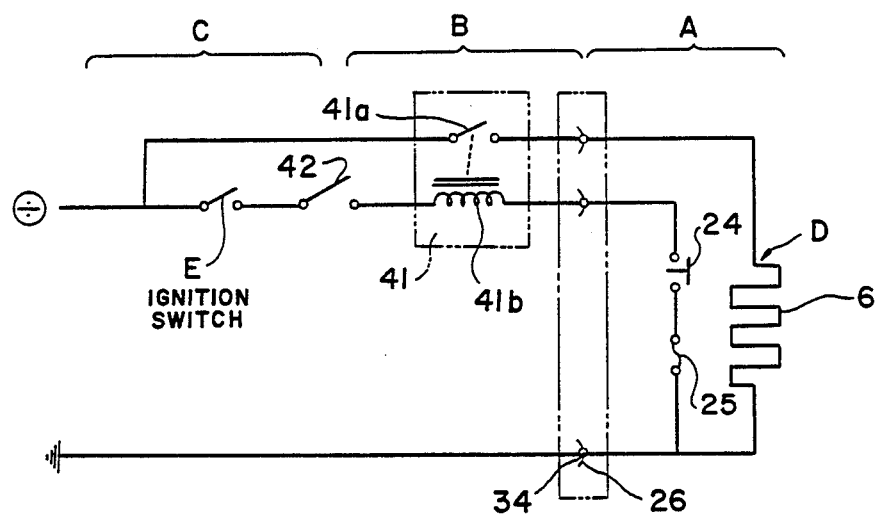
FIG. 5 is an electric circuit diagram.
Figure 6:
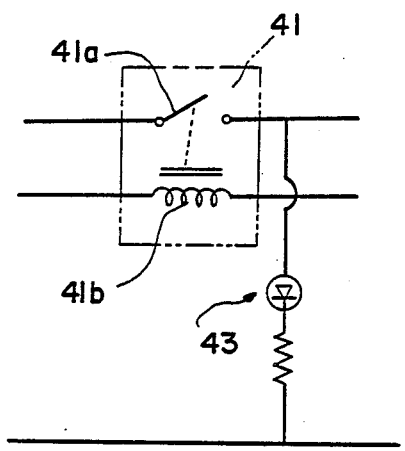
FIG. 6 is an electric circuit diagram showing the addition of LED 43 to the circuit of FIG. 5.

A case switch 42 is provided in the lower part of the outer casing A to permit ON/OFF operation of the heating pot B from the exterior. ON/OFF may be or may not be printed on the case switch 42. Referring to FIG. 5, the electric circuitry D with a battery as a power source is divided into a power supply circuit including the electric heater 6 and the contact 41a of the relay 41 which serves as a power supply switch and a control circuit in parallel with the power supply circuit and including an ignition switch E, the coil 41b of the relay 41, the thermostat 24 and the thermal fuse 25, two circuits being connected in parallel to each other because a large current of 10-20A flows through the former circuit. The case switch 42 is interposed between the ignition switch E and the coil 41b of the relay 41. As shown in FIG. 6, a LED element, 43 indicating that the case switch 42 is in ON position, is connected in parallel to the circuit including the coil 41b.

For operation of the heating appliance, with the heating pot B mounted in the outer casing A, the outer lid 9 covering over the opening 30, and the heater pot-side connector 26 inserted in the casing-side connector 34, the ignition is turned to the ACC (accessory) position to connect the electric circuitry D to the battery. As a result, the switch E is turned ON to permit control current to flow in the coil 41b of the relay 41 if the thermostat 24 is closed. Then, the contact 41a of the relay 41 by the energization of coil 41b is closed so that power is supplied to the electric heater 6. When water is heated to a specified temperature, the thermostat 24 closes and accordingly the relay 41 is turned OFF whereby power supply to the electric heater 6 is interrupted. When water is cooled down to a specified temperature, the thermostat 24 is once again closed, permitting power supply to the electric heater 6 so that water is heated again.

To use the boiled water, the push button 11 is depressed with a cup placed on the bottom wall 31a of the recess 31 in the outer casing A. Then, the push button 11 pushes down the bellows flange 13 to feed air by pressure into the bellows 14 through the air passage 19 into the internal vessel 3. This air pressure causes the hot water in the internal vessel 3 to flow through the pumping pipes 21, the hot-water passage 20 and the outlet 20a and then into the cup.

To use the heating pot B detached from the outer casing A, the operating plate 38 is pulled out to disconnect the pot-side connector 26 from the casing-side connector 34, and then the heating pot B is lifted off the outer casing by the handle 2. To fill the heating pot B after removal from the outer casing A, the upper outer lid 9 portion including the inner lid 16 is turned to be disconnected from the main body 1 of the heating pot B, water is poured in the internal vessel 3, and the upper outer lid 9 is replaced on the main body 1 of the heating pot B. Then, the heating pot B is inserted through the opening 30 in the outer casing A with the operating plate 38 being pulled out. The casing-side connector 34 fits on the pot-side connector 26 when the operating plate 38 is pushed in.

The heater 6 is supplied with power from a dynamo mounted in the vehicle when the ignition switch E is in the ON position. When the switch E is in ACC position, however, the heater 6 is fed with power from the battery, causing the battery to die. For preventing the battery death, the LED element 43 lights when the case switch 42 is set to ON, to give warning to the driver or passengers. The heating appliance for installation in a vehicle according to the above example is characterized in the following points:

(a) the square outer casing A surrounds substantially the whole cylindrical surface of the heating pot B as a protective cover which not only prevents the heating pot B from being damaged or deformed by external shock but also serves as a heat insulator for the heating pot B. Moreover, due to the outer casing A, the driver or passengers can never touch the heating pot B directly and are protected from being burnt even if the surface of the heating pot B is as hot as 50°-60° C.

(b) Since the heating pot B is detachably mounted in the outer casing A, it may be used as set in the casing A or independently from the casing A. Thus, when going camping in a car, for example, it is possible to boil water in the heating pot B while driving to the destination and to bring the heating pot B containing hot water into the tent at the camping site.

(c) The synthetic resin outer casing A provides heat insulating effect. Therefore, the ambient temperature surrounding the thermostat 24 fixed on the outer bottom of the internal vessel 3 of the heating pot B is stable irrespective of varying temperature in the vehicle, which facilitates the control of the water temperature.

(d) Even a household type heating pot B whose shape does not match the vehicle interior can be used if an outer casing A that suits the heating pot B is provided.

(e) The outer casing A can serve as a case for gloves or passenger tickets if it is not loaded with the heating pot B.

(f) Since the relay 41, which is a large controlling component, is not installed in the heating pot b but in the outer casing A, the heating pot B is small and easy to handle. It can be installed adjacent the driver's seat without hindering safe driving.

(g) The relay 41 inevitably becomes hot when power is supplied to the coil 41b and the contact 41a. In view of its performance, it is not desirable to install the relay 41 on the outer bottom of the internal vessel 3 containing hot water at about 90° C. or adjacent the electric heater 6. According to the present invention, the relay 41 is installed in the outer casing A at a position remote from the heater 6 so that power supply can be controlled at a stable temperature.

(h) The user can control the power supply time by ON/OFF operation of the case switch 42, to heat the water to a desired temperature.

The present invention is not intended to limit the shape of the outer casing A as disclosed in the above example in which the square casing A surrounds substantially the entire side surface of the cylindrical heating pot B. For instance, it may have such a construction as to surround only the lower part of the heating pot B and to effect enhanced heat insulation for the main body 1 of the heating pot B. The casing-side connector 34 and the pot-side connector 26 are not limited to those disclosed in the above example. They may be of magnet types, for example. The casing-side connector 34 may be of such a type that is connected to or disconnected from the pot-side connector 26 directly by hand.

As obvious from the description above, the present invention has the following advantageous effects:

(i) The heating pot which is detachably mounted in the outer casing may be used as mounted in the casing or independently from the casing. Therefore, it is possible to boil water in the heating pot while driving to a destination and to take out the hot water-containing heating pot from the casing to use it, for example, at a camping site.

(ii) It is possible to mount in a vehicle even a household type heating pot whose shape does not match the vehicle interior if an outer casing that suits the heating pot is installed.

(iii) The heating pot is small and easy to handle because large controlling components such as the relay are not positioned in the heating pot but in the outer casing. Moreover, it can be installed adjacent the driver's seat without hampering safe driving.

(iv) Large controlling electric components such as the relay are heated to a considerably high temperature when energized. In light of the performance, it is not preferable to install large controlling electric components on the outer bottom of the hot internal vessel or adjacent the heater. According to the present invention, the controlling electric components are installed in the outer casing at positions remote from the heater so that power supply is controlled at a stable temperature.

(v) Battery death is prevented by occasionally turning OFF the case switch. The engine key switch of the limited electric capacity is protected from overload.

(vi) Users can control the power supply time by ON/OFF operation of the case switch, thereby obtaining hot water at a desired temperature.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A heating unit detachably mountable in a motor vehicle and comprising
    an outer casing adapted to be fixedly secured on a portion of a vehicle,
    an electric heating appliance adapted to be removably supported in the outer casing,
    said outer casing having a recessed portion for removably receiving said heating appliance,
    said heating appliance having therein an electric heating element and a temperature sensor capable of producing switching signals indicative of heating appliance temperature,
    a first electrical connector adapted to be connected to a power supply of the vehicle, said first electrical connector being on said outer casing,
    a second electrical connector carried by said heating appliance,
    said first and second electrical connectors being arranged to detachably mate with each other when said heating appliance is seated within said recessed portion of said outer casing,
    a power control switch and means for actuating said power control switch in response to the switching signals produced by said temperature sensor in said heating appliance,
    said power control switch and said switch actuating means being located in said outer casing at a location remote and shielded from said heating element of said heating appliance when said heating appliance is seated in said recessed portion of said outer casing,
    said power control switch of said outer casing and said heating element of said heating appliance being connected in series with each other in a power supply circuit through said first connector of said outer casing and said second connector of said heating appliance,
    said temperature sensor of said heating appliance and said switch actuating means being connected in series with each other through said first and second connectors in a control circuit in parallel with said power supply circuit, and
    said outer casing only partially enclosing said heating appliance when said heating appliance is seated in said recessed portion of said outer casing so as to permit use of said heating appliance while so seated in said outer casing.

2. A heating unit as set forth in claim 1, wherein said power supply circuit further includes an on-off switch on said outer casing in series with said power control switch.

* * * * *